Sept. 15, 1936.　　　T. C. DELAVAL-CROW　　　2,054,583
DISK BRAKE
Filed March 8, 1935
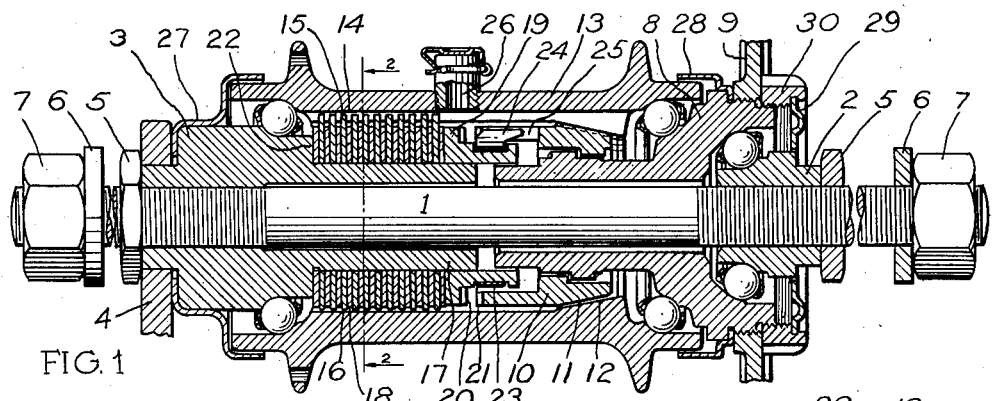
FIG. 1
FIG. 2
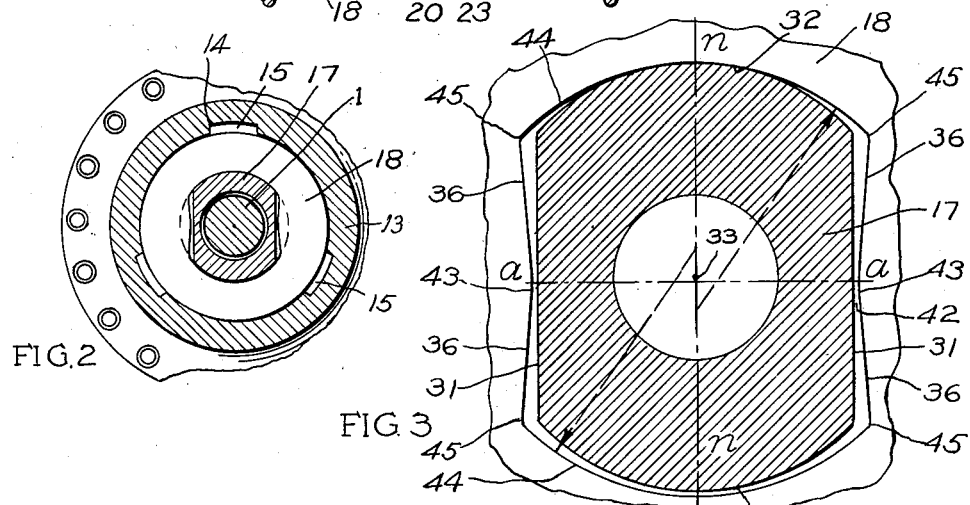
FIG. 3
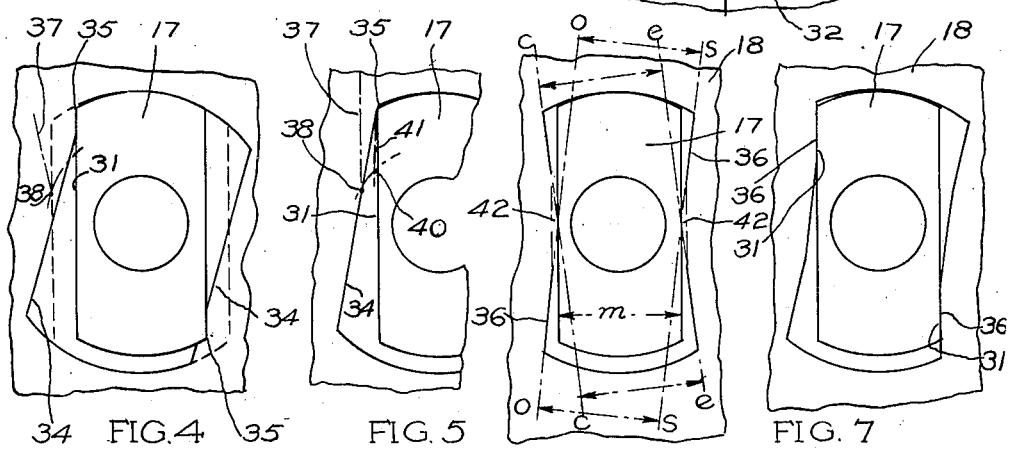
FIG. 4　　FIG. 5　　FIG. 6　　FIG. 7
INVENTOR:
THOMAS C. DELAVAL-CROW,
BY Gales P. Moore
HIS ATTORNEY.

Patented Sept. 15, 1936

2,054,583

UNITED STATES PATENT OFFICE 2,054,583

DISK BRAKE

Thomas C. Delaval-Crow, Bristol, Conn., assignor to General Motors Corporation, Detroit, Mich., a corporation of Delaware Application March 8, 1935, Serial No. 10,059

12 Claims. (Cl. 188—72)

My invention relates to clutch mechanisms, and is particularly applicable to devices of that character that embody disks and are employed for braking purposes, as for, example, in coaster brakes. Objects of my invention are to provide increased life and efficiency and to guard against mutilation and its resulting evils. To these ends, and also to improve generally upon devices of the character indicated, my invention consists in the various matters hereinafter described and claimed.

In the accompanying drawing, Figure 1 is a view of a coaster brake mechanism embodying my present invention, this view being chiefly in central, longitudinal section; Figure 2 is a cross-sectional view on about the line 2—2 of Figure 1, looking in the direction of the arrows; Figure 3 is an enlarged, cross-sectional view of the anchoring-sleeve and the central portion of one of the anchoring-disks; and Figures 4, 5, 6, and 7 are exaggerated, diagrammatic views.

The general construction of coaster brake herein illustrated is well known. The axle 1 has the cone 2 and brake-anchor 3 screwed upon it, the frame-engaging brake-arm 4 is non-rotatably fitted over the non-circular end of the brake-anchor, and lock-nuts 5 (also screwed upon the axle) securely fasten the cone and the brake-anchor and its arm against accidental displacement, the usual frame-ends of the bicycle being clamped between those lock-nuts, on the one hand, and the customary washers 6 and nuts 7, on the other. The threaded driver 8, carrying the usual sprocket wheel 9 (which is here only partly shown), is rotatable about the cone 2, and co-operates as usual with the rotatable, laterally-shiftable, threaded connector 10, whose conical end 11 engages into the socket 12 of the hub-shell 13 for driving the latter, that hub-shell being rotatably supported upon the driver and the body-block of the brake-anchor and having longitudinal grooves 14 that slidably receive lugs 15 extending radially from annular brake-disks 16 whose circular openings (indicated by broken lines in Figure 2) clear the enclosed non-circular sleeve 17 of the brake-anchor so that those disks rotate with the hub-shell. Slidably sleeved upon that non-circular sleeve and alternating with those rotatable disks are co-operating disks 18 whose peripheries are cleared by the hub-shell but whose non-circular openings prevent their rotation about the before-mentioned sleeve of the brake-anchor, so that these disks 18 serve as anchoring disks in braking. The usual brake-actuator 19 is also slidably, but non-rotatably, mounted upon the brake-sleeve, and has incline-faced teeth 20 adapted to intermesh with corresponding teeth 21 upon the end of the connector 10, so that when, upon back-pedalling, that connector is, as usual, forced toward the left as the parts are here shown, the disks 16 and 18 are squeezed together between the brake-actuator 19 and the brake-anchor's shoulder 22 with the result that the hub-shell is thus braked. An open-ring lag-spring 23, sprung about the non-rotatable brake-actuator, has a finger 24 slidably received in a kerf 25 in the end of the connector 10, and an oil-hole 26 leads into one of the grooves 14. Stamped shells 27 and 28 exclude dust, as does also the corrugated thin metal plate 29 whose periphery is forced into the slot in the lock-nut 30 for the sprocket wheel 9. The sleeve 17 of the brake-anchor has, as usual, straight, parallel sides 31, while its top and bottom faces, 32, are arcs of a circle whose center, 33, is that of such sleeve, as indicated by Figure 3, and, to facilitate assembly as well as to afford proper freedom of movement of the disks laterally into and out of braking position, the sleeve-receiving openings in the anchoring-disks are somewhat larger in area than is the cross-section of the supporting anchor-sleeve, with the result that when, for braking, an anchoring-disk is squeezed between its neighboring hub-carried, rotating disks 16, these rotating disks pull the anchoring-disk angularly with them until the play between anchoring-disk and anchoring-sleeve is taken up and the side faces of the anchoring-disk's openings engage the sides of the anchoring-sleeve.

Prior to my invention such side faces of the openings, from end to end of such openings, were made straight and parallel with each other and with the central axis of the disk's opening, as indicated by Figure 4, and when a disk was free and stood in its central position with such side faces spaced the normal amount from the anchoring-sleeve (that is, the amount proper for satisfactory clearance, as for assembling, etc.), those side faces were also parallel with the sides of the anchoring-sleeve, as indicated by the dash lines of that last mentioned figure. From this it has resulted that the straight inner faces 34 of the anchoring-disks met and inter-engaged with the corners 35 of the anchoring-sleeve, or holder, 17 at an angle, as indicated by Figure 5, and, consequently, continued and repeated pulling and jamming of these faces against such corners caused the latter to bite and wear into the anchoring-disks, as indicated by Figure 4. This biting and wearing not only mutilated the steel anchoring-disks but also threw up on them burrs that projected from their sides, with the result that at times, upon squeezing of the brake-disks together, these burrs became so firmly embedded into the neighboring bronze hub-disks as to effectually lock the latter to the steel anchoring-disks and thus either cause the lugs 15 to be sheared off or prevent resumption of rotation of the hub shell even when desired to drive the latter.

In the illustrated embodiment of my invention (see particularly Figure 3) the minimum width of the disk's opening is at what may be termed the diameter with respect to which the disk's rotation occurs, here shown as that disk-diameter, a—a, which is perpendicular to the disk's central axis n—n at substantially the center of the disk's revolution when braking, and from that point of minimum diameter each engaging-face 36 of the disk inclines outwardly, that is, it inclines away from that central axis as such surface proceeds away from that diameter. In the diagrammatical Figures 4 and 5, which show the formerly used faces (34) straight from end to end of the opening, the above mentioned inclined or cut-back engaging face 36 of my present invention is indicated by the dot-and-dash lines 37, and from these diagrams it will be apparent that by thus cutting back the face, a point, 38, upon it will, upon rotation of the disk, be permitted to move further toward the engaging-surface 31 of the anchoring-sleeve than it was permitted to so move when the old face 34 was stopped by the corner 35, such point 38 as indicated by Figure 5 moving forward to the position 40 by the time the line 37 of the cut-back face engages such corner 35, with the result that the angle of contact between sleeve and disk is reduced, as indicated by the line 41, with consequent reduction, or elimination, of the above-mentioned evil of forcing the sleeve-edge or corner into the disk-face or thin edge upon impact between those parts. Preferably, the lines in which diagonally-opposed, simultaneously-acting impact faces of the disk respectively lie (as the lines of the group c—c and e—e and also of the group o—o and s—s of Figure 6), are parallel with each other and are spaced apart just the distance of the width, m, of the co-operating anchoring-sleeve 17, and the result of this is that when the disk is turned into its position of rest, as shown in Figure 7, those diagonally-opposed active impact faces 36 lie squarely against the sides 31 of the anchoring-sleeve 17 and no angles are presented to permit the sleeve to dig into the disk. Nevertheless, ample clearance, 42 (Figure 6), may be left between disk and anchoring-sleeve at each side of the latter, because, unlike the conditions pertaining in the old structures having the straight faces 34 as shown in Figures 4 and 5, although the clearance becomes reduced or disappears when the disk has been swung into braking position, clearance at least as great as that normally employed prior to my invention can result when the disk swings back out of braking position.

In a coaster brake mechanism the braking pull upon the disks is always in the same direction and, therefore, for a given assembly only the same two contact faces of the disk ever come into braking engagement with the anchoring-sleeve 17, as indicated by Figure 7. Nevertheless, I prefer to make the disk's opening symmetrical and provide it with the four contact faces 36, thus giving the opening a waisted contour as shown in Figure 3, for such a disk requires no selection of front or back or top or bottom for purposes of assembly, and those of its faces 36 that do not brake serve to limit the disk's extent of angular movement away from braking position. I also prefer to connect adjacent faces 36 by a curved portion 43 as this avoids any sharp juncture to either scrape into the anchoring-sleeve or be roughened by that sleeve.

In actual practice good results have been secured when, with an anchoring-sleeve one-half inch in width and sixty-six one-hundredths of an inch in major diameter, the opening in the anchoring-disks has been fifty-one one-hundredths of an inch in minor diameter (the center of the waist, at the line a—a) and six-hundred-and-sixty-seven one-thousandths of an inch in major diameter (on the axis n—n), has had its faces 36 inclined at an angle of five degrees to the disk's major axis n—n and joined by a curved portion 43 having a radius of three-eighths of an inch centered upon the minor axis of the disk, the end faces 44 being arcs of curves centered upon the disk's major axis and having a radius of three-eighths of an inch, and the meeting-points 45 between impact faces 36 and end faces 44 being formed upon a radius of about twenty-five one-thousandths of an inch.

Thus, my present device is easily and inexpensively made and yet affords ample clearance for ease in assembling and efficiency in operation while avoiding mutilation or marring with its attendant evils.

I claim as my invention:

1. In a device of the character indicated, relatively rotatable laterally inter-engaging elements, a part with relation to which one of said elements has rotation limited by a portion of said element engaging a portion of said part, there being increasing space between said portions as said portion of said element of said limited rotation proceeds away from its axis of rotation, and means for squeezing said laterally inter-engaging elements toward each other; substantially as described.

2. In a device of the character indicated, the combination with an anchoring member, of an anchoring brake element having an opening receiving the same, said brake element having rotation relative to said anchoring member and limited by engagement of the edge of such opening with an arresting portion of said anchoring member, there being increasing space between said edge and said arresting portion as said edge proceeds away from the axis of rotation of said brake element; substantially as described.

3. In a device of the character indicated, the combination with an anchoring member, a hub rotatable about the same, and a rotatable brake element carried by said hub, of an anchoring brake element at the side of said rotatable brake element, said anchoring element having limited rotation relative to said anchoring member and having an opening that receives said anchoring member and has sides extending in lines that are angular to each other, and means for squeezing said brake elements toward each other; substantially as described.

4. In a device of the character indicated, the combination with an anchoring member, a hub rotatable about the same, and rotatable brake disks carried by said hub and provided with openings receiving said anchoring member, of anchoring brake disks intermediate said rotatable disks, said anchoring disks having limited rotation relative to said anchoring member and having waisted openings receiving said anchoring member, and means for squeezing said disks upon each other; substantially as described.

5. In a device of the character indicated, a brake anchoring member held against rotation and having opposite sides which are non-arcuate, a plurality of thin brake disks sleeved over said anchoring member, the openings through said disks being larger in all directions than the anchoring member for easy assembly thereon, portions of the edges of the disks at the sides of their openings being withdrawn farther away from the sides of the anchoring member as such edges proceed away from the middle of the disks, whereby said edges will conform to the sides of the anchoring member upon relative rotation and distribute impact; substantially as described.

6. In a device of the character described, a brake anchoring member held against rotation and having a disk supporting portion and a side portion which is straight, a brake disk having an opening therethrough to slip over said anchoring member, the edge of the opening having a portion which is supported on the supporting portion of the anchoring member, another portion of the edge of the opening being normally inclined with respect to the straight portion of the anchoring member and receding therefrom in a direction away from the middle of the disk and at such an angle that the straight portion of the opening will conform to the straight portion of the anchoring member upon relative rotation; substantially as described.

7. In a device of the character indicated, a brake anchoring member, a hub rotatable about the anchoring member, disks keyed to the hub and rotatable therewith, the anchoring member having a disk supporting surface and opposite side portions which are straight, a plurality of brake disks alternating with the hub disks and having openings to slip over said anchoring member, each disk having a portion of the edge of its opening supported on said supporting surface of the anchoring member, opposite portions of the edge of the opening being normally inclined away from the straight portions of the anchoring member when the disk is centered thereon, said inclined portions being adapted to conform to the straight portions of the anchoring member upon relative rotation; substantially as described.

8. In a device of the character indicated, the combination with a holding member, of a relatively rotatable element having an opening therethrough receiving said holding member, each side of said opening extending in lines that are angular to each other and are joined by a curve; substantially as described.

9. In a device of the character indicated, the combination with an anchoring-member having substantially straight sides, of a disk rotatable relatively to said anchoring-member and receiving the same in an opening that extends through the disk and that has a waist at substantially that diameter which is substantially perpendicular to said disk's central axis at substantially the center of said disk's rotation, the faces of the disk at the sides of said opening inclining away from said central axis as they proceed away from said waist, and adjacent said faces being joined by a curved portion; substantially as described.

10. A brake-set comprising rotatable brake elements and co-operating anchoring brake elements, said anchoring brake elements having openings therethrough whose sides extend in lines that are angular to each other; substantially as described.

11. A brake-set comprising rotatable brake elements and co-operating anchoring brake elements, said anchoring brake elements having waisted openings therethrough; substantially as described.

12. A disk of the character indicated having an opening therethrough of which each side extends in lines that are angular with respect to each other and are joined by a curve; substantially as described.

THOMAS C. DELAVAL-CROW.